United States Patent
Yang et al.

(10) Patent No.: US 7,067,190 B1
(45) Date of Patent: Jun. 27, 2006

(54) CAPSULES UTILIZING A LUBRICANT

(75) Inventors: San-Ming Yang, Mississauga (CA);
Ahmed Alzamly, Mississauga (CA);
Naveen Chopra, Oakville (CA); Peter M. Kazmaier, Mississauga (CA);
Man-Chung Tam, Mississauga (CA);
Thomas Enright, Tottenham (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/092,036

(22) Filed: Mar. 29, 2005

(51) Int. Cl.
*B32B 5/16* (2006.01)
*A61J 3/07* (2006.01)

(52) U.S. Cl. .............. 428/402; 428/402.2; 428/402.21; 428/913; 264/4

(58) Field of Classification Search ...................... None
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 4,261,653 A | 4/1981 | Goodrich | |
| 4,438,160 A | 3/1984 | Ishikawa et al. | |
| 5,037,716 A | 8/1991 | Moffat | |
| 5,262,098 A | 11/1993 | Crowley et al. | |
| 5,262,809 A | 11/1993 | Nishimura et al. | |
| 5,344,594 A | 9/1994 | Sheridon | |
| 5,389,945 A | 2/1995 | Sheridon | |
| 5,717,514 A | 2/1998 | Sheridon | |
| 5,825,529 A | 10/1998 | Crowley | |
| 5,989,629 A | 11/1999 | Sacripante et al. | |
| 6,067,185 A | 5/2000 | Albert et al. | |
| 6,097,531 A | 8/2000 | Sheridon | |
| 6,419,982 B1 | 7/2002 | Sacripante et al. | |
| 6,445,490 B1 * | 9/2002 | Chopra et al. | 359/296 |
| 6,524,500 B1 | 2/2003 | Sheridon et al. | |
| 6,549,327 B1 | 4/2003 | Foucher et al. | |
| 6,703,074 B1 | 3/2004 | Sacripante et al. | |
| 6,795,228 B1 | 9/2004 | Sacripante et al. | |

* cited by examiner

*Primary Examiner*—Jennifer C. McNeil
*Assistant Examiner*—Timothy M. Speer
(74) *Attorney, Agent, or Firm*—Pepper Hamilton LLP

(57) ABSTRACT

A capsule containing a rotatable element and a dielectric liquid including a lubricant dispersed therein.

21 Claims, 4 Drawing Sheets

CAPSULES UTILIZING A LUBRICANT

BACKGROUND

1. Technical Field

The description set forth herein relates generally to encapsulated materials having improved optical performance and a method of manufacturing thereof. More particularly, the description relates to utilizing a lubricant in encapsulated materials to improve optical performance.

2. Description of Related Art

Display technologies based on encapsulation of electrophoretic particles, multichromal rotatable elements and liquid crystals have many potential applications in fields such as digital document media, for example, electronic paper. High brightness and high contrast are two of the main performance requirements for digital document media applications.

Multichromal displays, also called twisting-ball displays, rotary ball displays, particle displays, bipolar particle light valves, etc., offer a technology for making a form of electric paper. Multichromal displays are addressable displays including a plurality of optically anisotropic balls, each of which can be selectively rotated to orient a desired surface for viewing by an observer. For example, multichromal displays can incorporate particles each having two distinct hemispheres, one black and the other white, with each hemisphere having a distinct electrical characteristic (e.g., zeta potential with respect to a dielectric fluid) so that the particles are electrically as well as optically anisotropic. Other kinds of rotating elements are also known. For example, U.S. Pat. No. 4,261,653, which is incorporated herein by reference in its entirety, discloses a multilayer sphere, although it is made at least in part from glass and its use depends on an addressing scheme involving high-frequency electric fields.

U.S. Pat. No. 5,389,945, incorporated herein by reference in its entirety, shows that multichromal displays can be made that have many of the desirable qualities of paper, such as flexibility and stable retention of a displayed image in the absence of power, not found in conventional display media. Multichromal displays can also be made that are not paper-like, for example, in the form of rigid display screens for flat-panel displays. Multichromal displays are also disclosed in U.S. Pat. Nos. 5,262,098, 5,344,594, 5,717,514, 5,989,629, and 6,097,531, each incorporated herein by reference in its entirety.

In known bichromal displays, capsules or microcapsules include rotatable elements, such as black-and-white balls, commonly referred to as bichromal beads. Optionally, other bichromal balls may be used, as any combination of two colors may be used. These bichromal beads are embedded in a sheet of optically transparent material, such as an elastomer layer, which contains spheroidal cavities and is permeated by an oil such as a transparent dielectric fluid, such as a plasticizer. The fluid-filled cavities are sized to accommodate the bichromal beads, one bichromal bead per cavity, so as to prevent the rotatable elements from migrating within the sheet. The bichromal beads may be selectively rotated within their respective fluid-filled cavities, for example by the application of an electric stimulus, such as an electric field, so as to present either the black or the white hemisphere to observers viewing the surface of the sheet. Thus, by application of an electric field that is addressable in two dimensions (as by a matrix addressing scheme), the black and white sides of the bichromal beads can be caused to appear as the image elements (e.g., pixels or subpixels) of a displayed image.

Common bichromal capsule formulations may utilize X-5175 (X-5175 is available from Baker-Petrolite and is a poly(ethylene oxide-b-ethylene) block copolymer) to improve pigment charging and dispersion and thus improve optical performance. This formulation of the capsule is designated as "mainline" to distinguish it from various "custom" formulations, which exclude the X-5175. However, based on current encapsulation processes of mainline beads, the encapsulated rotatable elements exhibit low contrast properties. A primary reason for this low contrast may be attributed to the fact that under an electric field the rotatable element makes contact with the capsule wall before complete rotation, specifically approximately 180°, can occur. It is known in the art that rotatable element translation and rotation are related to the rotatable element monopole charge and dipole torque, respectively. Charge analysis further demonstrates that the X-5175 in mainline rotatable elements alters the balance between the monopole charge and the dipole charge. In the example of an encapsulated mainline bead, the dipole charge is less than the monopole charge causing the rotatable elements to come in contact with the wall before the rotatable element can complete a 180° rotation, typically only rotating about 90° to about 130°. One solution to address this problem is to utilize a higher viscosity fluid inside the capsule. The higher viscosity fluid slows down the translation motion of the rotatable element through viscous drag thereby providing time for the rotatable element to rotate prior to making contact with the capsule wall. However, the higher viscosity fluid also causes the rotation motion to become sluggish and thereby still hinders the rotatable element from fully rotating and thus allowing for any improvement in optical performance and contrast ratio properties.

Accordingly, there is a need for encapsulated materials and an encapsulation process thereof that allows a rotatable element located therein to rotate in a more desirable manner prior to making contact with a capsule wall. Such rotatable elements may achieve improved contrast ratio and optical performance.

SUMMARY

In an embodiment, a capsule includes a rotatable element and a dielectric liquid. The dielectric liquid includes a lubricant dispersed therein. The lubricant reduces friction between the rotatable element and an inner wall of the capsule. The lubricant may be substantially immiscible in the dielectric liquid, with a refractive index (n) similar to the dielectric liquid, for example, in the range of about 1.3 to about 1.6. The lubricant may be about 5 to about 15 weight percent of the dielectric liquid. The lubricant may be spherical in nature. The lubricant may be silica particles and may be about 0.1 μm to about 5 μm in diameter, for example about 1.5 μm in diameter. The capsule may be utilized in a display member, display device and the like.

In another embodiment, a display member includes a plurality of capsules having a rotatable element and a dielectric liquid having a lubricant dispersed therein. Alternatively, a display device may include a first substrate including a plurality of capsules. The capsules include a rotatable element and a dielectric liquid including a lubricant. The display device may also include a second substrate and a third substrate. The first substrate may be located between the second substrate and third substrate.

In another embodiment, a process for generating a capsule may include encapsulating a rotatable element in a dielectric liquid within the capsule. The rotatable element may contain at least two surfaces differing from each other in optical and electrical characteristics. The dielectric liquid includes a lubricant.

The lubricant may be substantially immiscible in the dielectric liquid and acts to minimize friction between the rotatable element and the capsule to allow the rotatable element to rotate about 150° to about 190°. The lubricant may include particles spherical in shape and may, for example, include silica particles. The particles may be about 0.1 µm to about 5 µm in diameter and may be about 5 to about 15 weight percent of the dielectric liquid. The capsule may have a contrast ratio greater than about 1.5 and demonstrates improved optical performance. In a further embodiment, capsules generated from this process may be utilized in a display member, display device, or the like.

Another embodiment includes a display member with a layer including a plurality of capsules. Each capsule includes a rotatable element within a dielectric liquid. The dielectric liquid includes a lubricant dispersed therein. The lubricant includes spherical particles. The lubricant includes about 5 to about 15 weight percent of the dielectric liquid. The rotatable element in the capsule rotates about 150° to about 190° under an external electric field prior to making contact with an inner wall of the capsule.

An additional embodiment is directed to a lubricant for a capsule. The lubricant may include particles dispersed in a dielectric liquid of the capsule. The lubricant may reduce friction between a rotatable element and an inner wall of the capsule to allow for complete rotation, for example, of about 1500 to about 190° rotation of the rotatable element, under an external electric field.

DETAILED DESCRIPTION

In embodiments, the words "bead", "particle" and "bichromal" are used interchangeably to refer to a rotatable element for a display medium, such as a twisting cylinder, microcapsule, bead, electrophoretic material or any other bichromal or multichromal material that may be modulated by an applied electric or magnetic field. For example, a bichromal bead in an oil-filled capsule may rotate inside the capsule in response to the applied field.

Reference to rotation in the disclosure refers to a rotatable element rotating from a first hemisphere to a second hemisphere within a dielectric liquid. Rotation may occur in a clockwise or counterclockwise direction. Complete rotation as referred to in the disclosure is a reference to the rotatable element rotating approximately 180°. For example, an initial position for a rotatable element includes a first hemisphere on top and a second hemisphere on bottom. After complete rotation, i.e. 180° rotation, the second hemisphere is on top and the first hemisphere is on bottom. Additionally, reference to "complete" rotation also includes rotation of the rotatable element from about 150° to about 190°, particularly about 170° to about 190°. A rotation of about 150° to about 190° may also provide a similar result as a rotation of 180° and thereby qualifies as a "complete" rotation. An incomplete rotation is one where the rotatable element rotates less than about 150° or greater than about 190°.

It must also be noted in embodiments and in the appended claims, the singular forms "a," "an," and "the" include plural references unless the context clearly dictates otherwise. Thus, for example, reference to a "rotatable element" is a reference to one or more rotatable elements and equivalents thereof known to those skilled in the art, and so forth. Unless defined otherwise, all technical and scientific terms used herein have the same meanings as commonly understood by one of ordinary skill in the art. Any methods, materials, and devices similar or equivalent to those described herein can be used in the practice or testing of embodiments described herein.

The disclosure is generally directed to display members containing capsules having improved contrast ratio and optical performance properties. In particular, the disclosure is directed to capsules containing a lubricant that acts to reduce the friction between a rotatable element and an inner wall of the capsule so as to allow the rotatable element to rotate to more fully align with the direction of an applied field. The rotatable element rotates in the range of about 150° to about 190° to maximize the contrast and thereby improve optical performance.

Figure 1:
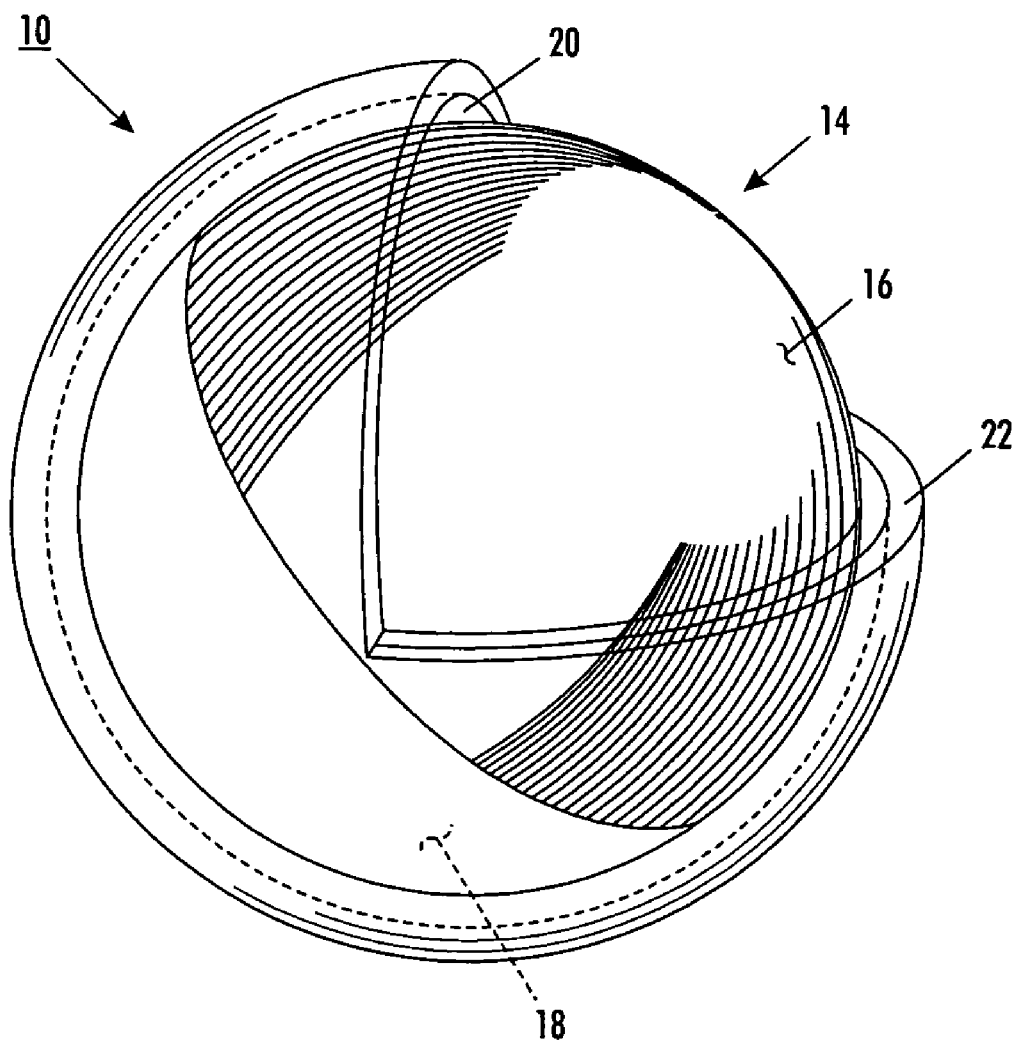
FIG. 1 is a partial cut away perspective view of an encapsulated rotatable element.

Capsules utilized in display members can be made by a variety of encapsulation processes. More specifically, these encapsulation processes where rotatable elements or cores are encapsulated are illustrated in U.S. Pat. Nos. 4,143,103, 4,438,160, 5,262,809, 6,419,982, 6,524,500, and 6,703,074, the disclosures of which are totally incorporated herein by reference. FIG. 1 illustrates an encapsulated rotatable element or capsule 10. In further detail, the capsule 10 with an inner wall 12 includes a rotatable element 14 formed of a first material 16 and a second material 18. The capsule 10 also includes a liquid third material 20 that surrounds the rotatable element 14. The rotatable element 14 and the liquid third material 20 are disposed within a solid shell fourth material 22.

The rotatable element 14 can have a size of from, for example, about 1 to about 200 microns, particularly from about 80 to about 110 microns, in volume average diameter as measured by the Coulter Counter. Once the rotatable element 14 is encapsulated, the encapsulated rotatable element has a size (average diameter) of from, for example, about 5 to about 300 microns, particularly from about 100 microns to about 150 microns.

The first material 16 and the second material 18 divide the rotatable element 14 into two hemispheres. The hemispheres of the rotatable element 14, namely the first material 16 and the second material 18, with different surface colors, are both optically isotropic and electrically isotropic in the presence of a dielectric fluid so as to be subjected to rotation upon application of an electric field. The first material 16 and the second material 18 may be pigmented plastics. For example, the first material 16 may be black pigmented plastic, while the second material 18 may be white pigmented plastic.

The rotatable elements may be generated from a variety of different materials such as plastic and/or wax materials, for example, nylon and Carnauba wax. The term "wax" is utilized to refer to a low-melting organic mixture of compound of high molecular weight, solid at room temperature, and generally similar in composition to fats and oils except that it contains no glycerides. Some are hydrocarbons, others are esters of fatty acids and alcohols. They are classed among the lipids. Waxes are thermoplastic, but because they are not high polymers, they are not considered in the family of plastics. Common properties, are water repellency, smooth texture, low toxicity, freedom from objectionable odor and color. They are combustible and have good dielectric properties; soluble in most organic solvents, insoluble in water. The major types are as follows: Natural: (1) Animal (beeswax, lanolin, shellac wax, Chinese insect wax); (2) Vegetable (carnauba, candelilla, bayberry, sugar cane); (3) Mineral: Fossil or earth waxes (ozocerite, ceresin, montan); Petroleum waxes (paraffin, micro-crystalline)(slack or scale wax). Synthetic: (1) Ethylenic polymers and polyol ether-esters ("Carboxwax," sorbitol); (2) Chlorinated naphthalenes ("Halowax)"; (3) Hydrocarbon type, i.e., Fischer-Tropsch synthesis.

Examples of such commercially available materials and their sources include polyethylene and polypropylene waxes and their modified derivatives. One example of a polyethylene wax is Polywax® 1000, manufactured by Baker-Petrolite Corporation. This material is a nearly crystalline polyethylene wax with a narrow molecular weight distribution, and, consequently, a narrow melt distribution. This material retains a low melt viscosity until just above the melting temperature, a desirable property for the spherodization of the particles. Other examples include lower molecular weight Polywax materials, such as Polywax® 400, Polywax® 500, Polywax® 600, Polywax® 655, Polywax® 725, Polywax® 850, as well as higher molecular weight Polywax materials such as Polywax® 2000, and Polywax® 3000. Other examples of commercially available polyethylene waxes include members of the Licowax product line, available from Clariant. Examples of such materials include: Licowax PA520 S, Licowax PE130, and Licowax PE520, as well as micronized polyethylene waxes such as Ceridust 230, Ceridust 3615, Ceridust 3620, and Ceridust 6071.

In various exemplary embodiments, the material used for the white hemisphere of the ball may include Polywax® 1000 into which titanium dioxide pigment is dispersed for whiteness. In various exemplary embodiments, on the black hemisphere of the ball a variety of black pigments may be used, such as manganese ferrites or carbon black. In various exemplary embodiments, the pigment for the black hemisphere is Ferro 6331, manufactured by the Ferro Corporation.

Liquid third material 20 may be any suitable liquid for liquid immersion development, for example, dielectric liquids including transparent oil or selected known liquid immersion inks. The liquid third material 10 may have a viscosity of about 2 centistokes and a thickness that is about equal to about 5 to about 20% of the diameter of the rotatable element 14. While the disclosure may refer to the liquid third material 20 as an oil phase, the third material may be a dielectric liquid, such as that sold under the tradename Isopar® by Exxon Corporation, an isoparaffin liquid, or it may be a partially fluorinated liquid such as Halocarbon 1.8 which may have about 1 or about 2 centisoke viscosity, or it may be silicone oil such as Dow Corning 200 silicone liquid, which may have viscosity of about 1 to about 5 centistoke or lower. Other dielectric fluids include, for example, any plasticizer fluid, partially fluorinated fluids such as, for example, 3M HFE 7100, a partially fluorinated hydrocarbon made by 3M, partially fluorinated hydrocarbons made by Halocarbon Products Inc. or Freon TF, a partially fluorinated polyethylene, oils such as, for example, silicon oils, vegetable oils such as, for example, soybean oil and coconut oil, trigliceride fluids such as, for example, tributyrin and tricaproin, fully fluorinated liquids such as, for example, perfluorooctane, aromatic organic solvents such as, for example, benzene, toluene, or xylene, deionized water, mixtures thereof, etc. Mention may also be made of the materials listed in U.S. Pat. No. 6,067,185 beginning at column 16, line 17, incorporated herein by reference.

The rotatable element 14 is encapsulated by and rotates within liquid third material 20. The material of the solid shell fourth material 22 has a greater viscosity than the liquid third material 20 and may be any highly transparent and physically tough polymer with a temperature/viscosity profile that will allow it to engulf the rotatable element 14 sufficiently quickly to enable encapsulated bead formation. While any suitable polymer material may be used without limitation for the shell, the shell can be a polymer derived from two monomers that can be dissolved, respectively, in two mutually immiscible solvents (such as, for example, organic solvents and water). This enables the polymer to be formed at the interface of the two solvents via interfacial condensation polymerization, as more fully explained below.

Examples of materials for solid shell fourth material 22 include those which may be formed in an interfacial condensation polymerization process. Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly(ester-urethane) in an interfacial reaction, or an amine terminated amide prepolymer can be copolymerized with a diisocyanate to produce a poly(urea-amide) copolymer. Epoxy monomers or oligomers such as Epikote 819 can also be added in amounts of from about 0.01 percent to about 30 percent to copolymerize into the shell as strengthening agents. Various polyfunctional shell monomers, such as triamines, triisocyanates, and triols can be employed in small quantities of from about 0.01 percent to about 30 percent as crosslinking agents to introduce rigidity and strength into the shells. Shell polymers can also be formed by the reaction of aliphatic diisocyanates, such as meta-tetramethylene diisocyanate and a polyamine, reference for example the U.S. Pat. No. 5,037,716, incorporated herein by reference in its entirety.

In various exemplary embodiments, the rotatable element may range between about 20 microns and about 150 microns in size. The liquid third material thickness when the encapsulated rotatable element is formed may lie between about 3% and about 20%, in particular 4% to about 6%, of the rotatable element diameter. The thickness of the solid shell fourth material when the encapsulated rotatable element is formed may lie between about 0.1% and about 10% of the rotatable element diameter, particularly about 1%.

Figure 2:
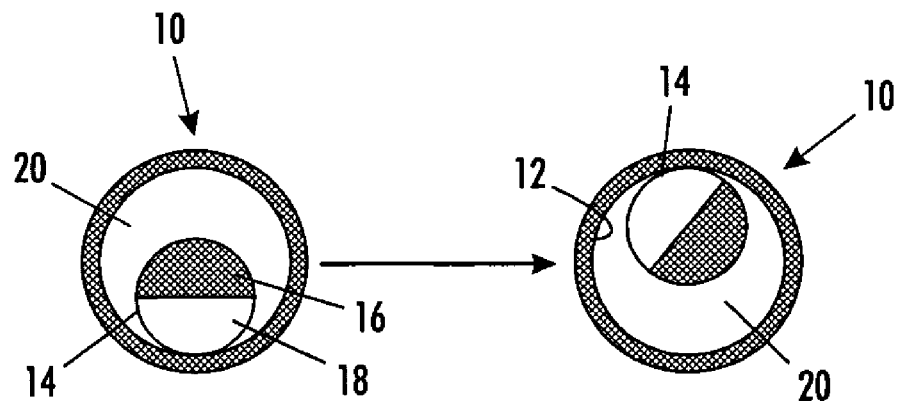
FIG. 2 is a cross-sectional view of a rotatable element illustrating incomplete rotation.
Figure 3:
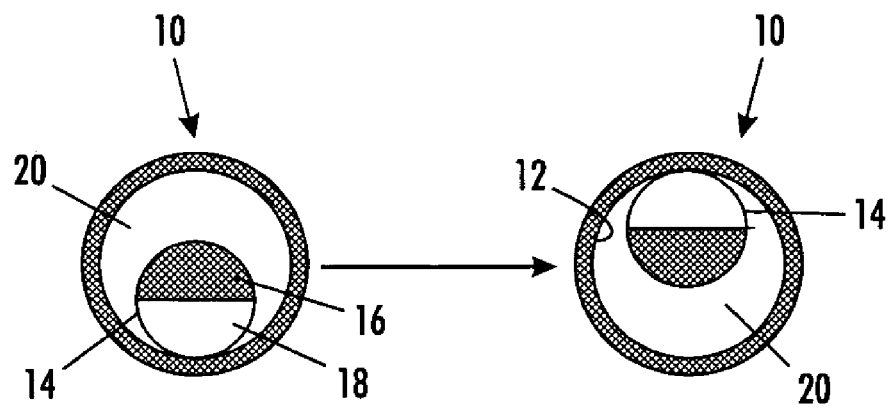
FIG. 3 is a cross-sectional view of a rotatable element illustrating complete rotation.

FIG. 2 illustrates an encapsulated bichromal bead or capsule 10 obtained by conventional encapsulation processes. In particular, the rotatable element 14 in capsule 10 makes contact with an inner wall 12 of the capsule 10 prior to rotating about 180°, commonly only rotating between 90° and 130°. This incomplete rotation affects contrast properties and in turn produces poor optical performance. Conversely, FIG. 3 illustrates a desired capsule 10 where the rotatable element 14 completes a rotation of about 180° prior to making contact with inner wall 12 of the capsule 10.

Figure 4:
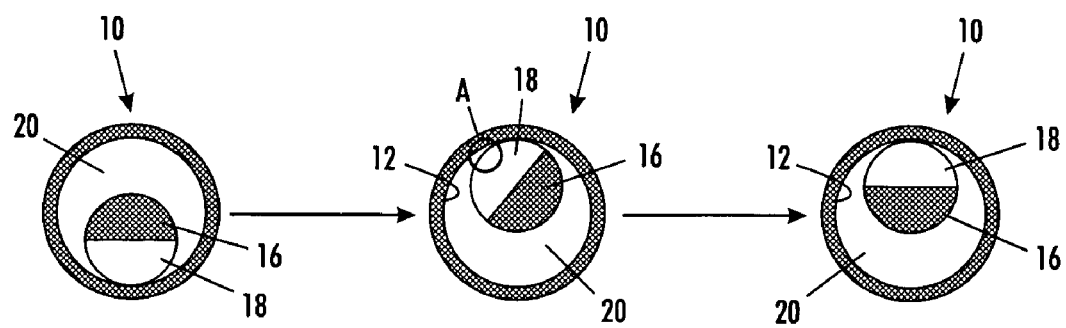
FIG. 4 illustrates a complete rotation of the rotatable element having a lubricant in accordance with the present disclosure.
Figure 5:
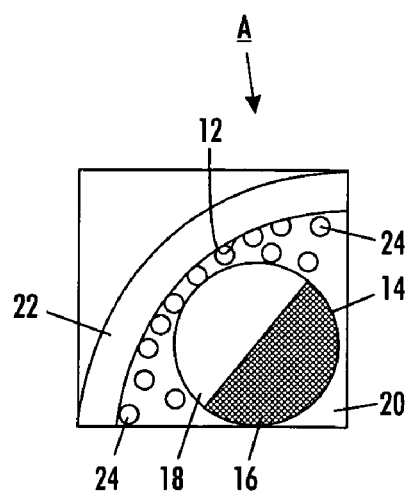
FIG. 5 is an exploded view of A in FIG. 4.

FIGS. 4 and 5 illustrate an embodiment of the present disclosure. In particular, the capsule 10 includes liquid third material 20 containing a lubricant 24 dispersed therein. Lubricant 24 includes particles, optionally spherical, that act to reduce the friction between the rotatable element 14 and the inner wall 12 of the capsule 10. Lubricant 24 may reduce the friction by at least about 50 percent so as to allow rotatable element 14 to completely rotate under an electric field prior to making contact with inner wall 12 of the capsule 10. Alternatively, rotatable element 10 may rotate about 150° to about 190°, or optionally about 170° to about 190°.

Lubricant 24 may be any material that is substantially immiscible in the liquid third material 20. Substantially, immiscible refers to the lubricant being at least about 80% immiscible in the liquid third material. Lubricant 24 may be any material that achieves, even dispersion in the liquid third material 20, with a refractive index ranging from about 1.3 to about 1.6. The refractive index of lubricant 24 is similar to the refractive index of the third liquid material 20, for example, Dow Corning 200 having a refractive index of about 1.405 and Halocarbon fluid with a refractive index of about 1.395. The refractive index of the lubricant 24 and the liquid material 20 are similar because a large difference in the two values may cause light scattering which can be disadvantageous to the optical performance of the display.

Particles such as silica including a number of known silica particles, in particular silicon oxides; suitable polymers, such as polymethylmethacrylate, polystyrene; and alumina, may be used as lubricant 24. For example, silicia particles as a lubricant may be prepared by base hydrolysis of tetraethylorthosilicate in ethanol. The size and dispersity of these particles may be controlled by changing the reactant concentration. The surface of these silica particles may then be modified by being anchored to a long chain alcohol, such as alcohols with about 14 to about 35 carbons, so that they may be dispersed easily into non-polar liquids such as Halocarbon 1.8 and Dow Corning silicon 200 fluid.

Lubricant 24 may be particles spherical in nature. The particles may be about 0.1 µm to about 5 µm in size, particularly about 0.2 µm to about 21 µm, and more particularly about 1.25 µm to about 1.75 µm. The liquid third material 20 may include about 5 to about 15 weight percent of the lubricant 24, and about 9 to about 11 weight percent of the lubricant 24. A higher concentration of the lubricant may tend to scatter the lubricant throughout the liquid third material 20 and, in turn, reduces the friction between the capsule and the bead. Consequently, a lower concentration of the lubricant may not reduce friction as much as the concentrations disclosed above due to the low number of particles.

FIGS. 4 and 5 illustrate the rotatable element 14 rotating completely under an electric field prior to making contact with the inner wall 12 of the capsule 10. As seen in FIG. 5, an exploded view of A in FIG. 4, prior to making contact with the inner wall 12 of the capsule 10, rotatable element 14 makes contact with the lubricant 24 dispersed in the liquid third material 20. The friction between the rotatable element 10 and the inner wall 12 is reduced, allowing the rotatable element 14 to completely turn.

The capsules described in the disclosure may be utilized in display members, or display devices and the like. For example, the display members may include a plurality of capsules of the disclosure formed on a substrate. The substrate can be a flexible material/sheet such as, for example, paper, a polymer or an elastomer. In an embodiment, the capsules may be sandwiched between two substrates.

Optionally, the encapsulated rotational elements may be coated upon the surface of the substrate by any suitable means, for example by spraying or painting, and may be attached thereto by any suitable means, for example through the use of an adhesive on the surface of the substrate or a flexible polymer binder applied with the encapsulated rotational elements. The capsules of the disclosure can be used in a variety of different display members or display devices as described in U.S. Pat. Nos. 4,126,854, 4,143,103, 5,389,945, 5,825,529, 6,549,327, and 6,795,228 the disclosures of which are totally incorporated herein by reference.

Embodiments of the disclosure may provide numerous advantages. For example, the encapsulated rotatable element may be utilized within a swollen sheet device yielding beneficial effects. Additionally, the encapsulated rotatable element may also be utilized with encapsulated custom elements.

EXAMPLES

Examples 1 and 2 represent an embodiment of the disclosure. In particular, Examples 1 and 2 use silica particles as a lubricant and two different liquid materials. Example 1 utilizes Halocarbon 1.8 oil in the oil phase and Example 2 utilizes 1 centistoke silicon oil in the oil phase. Examples 2 to 4 represent capsules prepared in a similar manner as described below with respect to Example 1. Examples 3 and 4 correspond to Examples 1 and 2 respectively, but do not include the presence of the lubricant of silica particles and may be referred to as control displays.

Example 1

Example 1 illustrates a microcapsule utilizing silica microspheres as a microlubricant in the oil phase of the microcapsule in accordance with the present disclosure.

Figure 6:
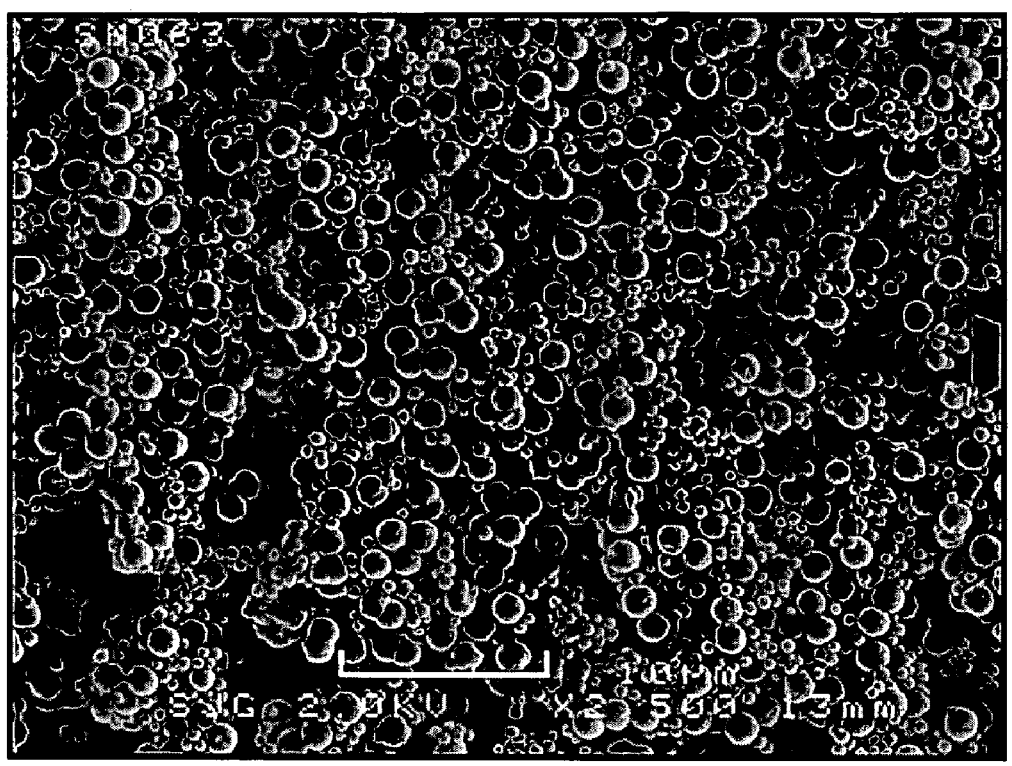
FIG. 6 is an SEM of silica microparticles in accordance with the present disclosure.

Preparation of Dodecyl-anchored silica sphere (SM063). The silica spheres lubricant were prepared by adding tetraethylorthosilicate (TEOS, 6 ml), distilled water (7 ml), and ammonium hydroxide (28%, 11 ml) to absolute ethanol (76 ml) and magnetically stirring in a 250 ml polyproplyene bottle. After about 5 minutes, the resulting solution was observed to be cloudy due to the formation of silica nanospheres. After 2 hours, 20 ml of TEOS was added over 30 to 45 minutes and stirred for an additional 3 hours. Then, a solution of ethanol (76 ml), ammonium hydroxide (28%, 11 ml) and distilled water (7 ml) were added, and 20 ml of TEOS was added over 1 hour. After stirring for an additional 18 hours, this solution was transferred to a 250 ml RB flask and about 90% or more of the solvents were distilled off with an oil bath temperature at 150° C. 1-Dodecanol (15 ml) was then added to the flask and the mixture was heated by a 300° C. oil bath for 5 hours to promote the condensation between 1-dodecanol and SiOH. The resulting lubricant of silica spheres, hereinafter referred to as modified silica spheres, were then isolated by repeatedly washing, centrifugation and ultrasonication in hexanes, followed by drying at 60° C. for about 18 to 24 hours. The particle sizes of the modified silica spheres were about 600 nm and 1500 nm by SEM as shown in FIG. 6.

Preparation of oil/mixture. The oil/mixture located in the capsule was then prepared, including the lubricant dispersed within the oil. 2 grams(g) of the modified silica spheres (SM063) were dispersed in 20 ml of Halocarbon 1.8 oil by ultrasonication for about 30 minutes. After complete dispersion of the modified silica spheres in the oil, another 20 ml of Halocarbon 1.8 oil was added and the resulting mixture was stirred for 5 minutes. 15 g of mainline beads were then added and the oil/mixture was stirred for 15 minutes.

Microencapsulation of oil/mixture (SM065B). For encapsulating the oil/mixture, distilled water (630 ml), 300 Bloom type-A gelatin (15 g) and sodium polyphosphate (1.5 g) were then charged into a 1 L stainless steel Buchi reactor and heated up to 40° C. at 500 rpm. A coacervate (an aggregate of particles) was formed after adding 20% acetic acid (2 ml) and the agitation rate was increased to 1000 rpm. The oil/mixture prepared above was added at once into the reactor. The mixture including the shell material and the oil/mixture was emulsified by stirring at 1000 rpm at 40° C. for 5 minutes and then initially cooling to 22° C. in 30 to 40 minutes, further to 5° C. in 40 minutes. At 5° C., 24% glutaldehyde (8.6 g) was added to the reactor. After 5 hours, the resulting product was warmed up to room temperature, for example 23 to 25° C., and stirred for about 18 to 24 hours.

Urea-Formaldehyde cross-linking. After stirring overnight, the resulting product inside the reactor was discharged into a 1 L beaker. Water (260 ml), urea (30 ml) and formaldehyde solution (37%, 41 ml) were added. The solution was then acidified by adding 20 ml glacial acetic acid and stirred at 500 to 600 rpm for 1.5 to 2 hours.

Washing and freeze-drying. The solution from above was poured into a filter bag (100° μm mesh). Excess coacervate and/or urea-formaldehyde particles were removed by repeat washing of the capsules with a copious amount of water. The washed material was then suspended in a 1 L beaker with water. Empty capsules, for example, capsules with no rotatable elements, which floated on top in the beaker were removed by suction. The bottom layer mainly contained capsules with rotatable elements, which were filtered on Buchi funnel and then redispersed in 50 to 100 ml water inside a freeze-dry bottle. The contents of the freeze-dry bottle was then freezed at about −30° C. and pumped dry overnight.

Purification of encapsulated bead. After freeze drying the contents in the freeze-dry bottle, different size capsules were classified by sieving. Optically active capsules were then isolated by known floatation methods. To amplify, 3 g of dried capsules (SM065B, 106 to 125 μm) which were comprised of the bead in the oil/mixture including the modified silica spheres were suspended in fluid 1 (density=1.50, HC1.8/1cSt silicone blend), with the top layer mainly being air-filled capsules and multiple-capsules. The bottom layer was then filtered and re-suspended in fluid 2 (density=1.60) and the top layer was isolated, washed with hexanes and air-dried.

Test devices were prepared by mixing 0.5 g of the dried capsules obtained from the above with 0.5 g of a 5-minute epoxy which was then sandwiched and cured between two ITO plates. The device thickness was about 300 μm.

Table 1 illustrates optical performance results for Examples 1 to 4. As can be seen, capsules having a microlubricant of silica particles in Examples 1 and 2 produced higher contrast ratios than Examples 3 and 4. While Examples 1 and 2 also demonstrate an increase in contrast ratio over control displays, they also produced no drawbacks on the operating voltage. Additionally, Example 2 produced a higher contrast ratio than achieved by Examples 3 and 4 which did not include the use of a lubricant.

TABLE 1

Optical performance of encapsulated beads.

| Example | Sample | Oil phase | Silica particle (micro-lubricant) | Operating Voltage/V | CR |
| --- | --- | --- | --- | --- | --- |
| 1 | SM065B | Halocarbon 1.8 | YES | 150 | 1.91 |
| 2 | SM065D | 1cSt silicon oil | YES | 70 | 1.58 |
| 3 | AA292A | Halocarbon 1.8 | NO | 70 | 1.41 |
| 4 | AA288A | 1cSt silicon oil | NO | 150 | 1.09 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A capsule comprising:
   a rotatable element; and
   a dielectric liquid comprising a lubricant dispersed therein, wherein the lubricant is substantially immiscible in the dielectric liquid.

2. The capsule according to claim 1, wherein the lubricant reduces friction between the rotatable element and an inner wall of the capsule.

3. The capsule according to claim 1, wherein the lubricant comprises particles of about 0.1 μm to about 5 μm in diameter.

4. The capsule according to claim 1, wherein the lubricant comprises silica particles.

5. The capsule according to claim 4, wherein the lubricant comprises spherical particles.

6. The capsule according to claim 1, wherein the lubricant comprises particles with a refractive index of about 1.3 to about 1.6.

7. The capsule according to claim 1, wherein the lubricant comprises about 5 to about 15 weight percent of the dielectric liquid.

8. The capsule according to claim 1, wherein the capsule is utilized in a display member.

9. A display member comprising a plurality of capsules in accordance with claim 1.

10. A process for generating a capsule, comprising:
    encapsulating a rotatable element in a dielectric liquid within the capsule, wherein the rotatable element has at least two surfaces differing from each other in optical and electrical characteristics; and
    wherein the dielectric liquid comprises a lubricant the lubricant, comprising spherical particles.

11. The process according to claim 10, wherein the lubricant minimizes friction between the rotatable element and the capsule to allow the rotatable element to rotate from about 150° to about 190°.

12. The process according to claim 10, wherein the lubricant comprises particles of about 0.1 μm to about 5 μm in diameter.

13. The process according to claim 10, wherein the lubricant comprises silica particles.

14. The process according to claim 10, wherein the lubricant comprises particles with a refractive index of about 1.3 to about 1.6.

15. The process according to claim 10, wherein the lubricant comprises about 5 to about 15 weight percent of the dielectric liquid.

16. The process according to claim 10, wherein the capsule has improved optical performance.

17. The process according to claim 10, wherein the capsule has a contrast ratio greater than about 1.5.

18. A display member comprising a plurality of capsules made in accordance with the process of claim 10.

19. A display member comprising a layer comprising a plurality of capsules, each capsule comprising a rotatable element within a dielectric liquid wherein the dielectric liquid comprises a lubricant dispersed therein, wherein the lubricant comprises spherical particles.

20. The display member according to claim 19, wherein the lubricant comprises about 5 to about 15 weight percent of the dielectric liquid.

21. The display member according to claim 19, wherein the rotatable element in the capsule rotates about 150° to about 190° under an external electric field prior to making contact with an inner wall of the capsule.

* * * * *